2,795,600
Patented June 11, 1957

2,795,600

PRODUCTION OF NITRILES

Henry C. Chitwood and Benjamin T. Freure, Charleston, W. Va., assignors to Union Carbide and Carbon Corporation, a corporation of New York No Drawing. Application June 25, 1954,
Serial No. 439,484

19 Claims. (Cl. 260—465.1)

This invention relates to a catalytic process for the preparation of aliphatic nitriles by the reaction in the vapor phase of primary alcohols and ammonia. It further relates to the preparation of improved chromium promoted catalysts for such reactions.

It is known to prepare aliphatic nitriles from primary alcohols and ammonia in the presence of a catalyst. Such a process is taught by Le Roy U. Spence et al. in U. S. Patents 2,337,421 and 2,337,422, using respectively silver and copper type catalysts and Richard C. Bishop et al. in U. S. Patent 2,487,299, using a molybdenum oxide catalyst. In these patents, as in other prior processes, relatively high temperatures have been considered necessary for satisfactory yields, from 350° C. to as high as the decomposition temperature of ammonia (700° C.). Such high temperatures greatly shorten catalyst life while lower temperatures decrease the yield to an impractical degree.

An object of this invention is to provide a catalytic process for the production of aliphatic nitriles from ammonia and primary alcohols wherein high yields are obtained. A further object is to provide such a process wherein the life of the catalyst will be prolonged. Yet another object of the invention is to provide a suitable catalyst for such a process.

We have now discovered that a low operating temperature range for the reaction ammonia and primary alcohols to form aliphatic nitriles can be achieved with the advantages of higher yield and longer catalyst life by the use of our catalyst. This catalyst is a chromium-promoted copper and activated alumina catalyst to which has been added a small amount, less than ten percent by weight of the total catalyst, of a compound of calcium, barium, lithium or strontium. The amount of copper in the catalyst is not narrowly critical, it having been found that copper oxide concentrations ranging from 3.0 percent to more than 15 percent are effective in the catalyst. The amount of chromium oxide in the catalyst can be varied from 0.25 to 2 percent. The activated aluminum used in our experiment was commercial grade F-1 supplied by the Aluminum Company of America.

The catalyst can be prepared by first covering activated alumina with a solution of a water soluble form of one of the alkali metals or alkali earth metals of the group comprising calcium, barium, strontium or lithium and then evaporating the solution to leave the metal compound deposited on the alumina. The activated alumina, upon which the calcium, barium, lithium or strontium has been deposited is immersed in a water solution of copper and chromium salts. The water is then evaporated off, leaving the copper and chromium salts additionally deposited on the activated alumina particles. The particles are then roasted to convert the copper and chromium salts to the oxides. If calcium is the metal employed, it will have been deposited as an organic salt and this calcium organic salt will be converted by this roasting to calcium carbonate. If barium, lithium or strontium are used, they will have been deposited as hydroxides and will be substantially unaffected by the roasting. When the catalyst is regenerated by oxidation, these hydroxides will probably pick up carbon dioxide formed by the regenerative burning off of carbon deposits and be substantially converted to the carbonate form. They are effective catalysts as either hydroxides or carbonates. Finally the particles are reduced with hydrogen before use which leaves the copper present mainly as the free metal.

Alternatively to the above procedure, the catalyst may also be made by simultaneously depositing the alkali metal, or alkali earth metal, copper and chromium salts from aqueous solutions onto the activated alumina, evaporating off the water, and then roasting at a temperature of 400° C. and reducing with hydrogen before use. The effective concentrations for each of the four workable metals are as follows:

| Alkali | Concentrations in percent by weight of total catalyst | | |
|---|---|---|---|
|  | Min. | Preferred | Max. |
| Calcium (calc. as carbonate) | 1.8 | 3.6 | 7.5 |
| Barium (calc. as hydroxide) | 1.0 | 4.0 | 5.0 |
| Lithium (calc. as hydroxide) | 2.0 | 5.0 | 6.0 |
| Strontium (calc. as hydroxide) | 1.0 | 5.0 | 6.0 |
| Barium (calc. as carbonate) | 1.2 | 4.6 | 5.8 |
| Lithium (calc. as carbonate) | 3.1 | 7.7 | 9.2 |
| Strontium (calc. as carbonate) | 1.2 | 6.0 | 7.3 |

The regeneration of the catalyst, referred to above, is done in the usual manner for inorganic catalyst of this general type. The catalyst is first steamed to remove the bulk of the high boiling material which has been deposited on the catalyst. It is then roasted in air at a temperature of about 350° C. until carbon dioxide no longer comes off. It is then reduced with hydrogen at a temperature of about 290° C.

Using the catalyst of the invention the alcohol and ammonia reaction can be run at temperatures of from 250° to 350° C. with the preferred range being 275° to 325° C. This range of operating temperatures, low in comparison with the prior art, permits long catalyst life as well as high yields of nitrile product, as high as 90 percent.

According to the method of our invention the reactants, a primary alcohol and ammonia, may be charged to the reactor either as liquids or as gases depending upon the ease with which either may be handled. The reactants are vaporized within a preheating area of the reactor before contact with the catalyst. Hydrogen gas is admitted to the reactor along with the reactants to serve as a diluent and to assist in regulating the flow of the reactants through the catalyst bed and in maintaining the catalyst in an active condition.

By the method of the present invention it is possible to form nitriles from almost any primary alcohol. Such alcohols include ethanol, n-propanol, n-butanol, isobutanol, 2-ethylhexanol, n-hexanol, 2-butyloctanol, 2-ethylbutanol, 2- or 4-methylcyclohexanemethanol, isoamyl alcohol, lauryl alcohol, benzyl alcohol and homologues of benzyl alcohol.

PREPARATION OF CATALYST

Example 1

Four hundred and thirty eight parts by weight of commercial activated alumina was covered with a solution of calcium acetate-monohydrate, consisting of 30 parts by weight of the acetate and 200 parts of water. Heat was applied to evaporate the water. The alumina thus coated was then covered with a solution containing 188 parts by weight of copper (II) nitrate-trihydrate, 12 parts of chromium (III) nitrate-nonahydrate and 100 parts of water. Heat was applied to evaporate the water and then roasting at 400° C. was employed until the evolution of nitric fumes had ceased. The resulting catalyst was reduced in a stream of hydrogen at a temperature of 290° C. before use.

PRODUCTION OF NITRILES

Example II

The reaction tube consisted of a vertical ⅛ inch thick steel pipe of one and one-half inches in outside diameter and forty-eight inches in length placed within a second ⅛ inch thick steel pipe three inches in outside diameter and approximately forty-inches in length, the ends of the outer pipe being welded to the inner. The outer pipe was insulated and wound with a "Nichrome" resistance wire to supply heat to the equipment. The annular space between the two tubes was partially filled with a commercial heating fluid to assist the transfer of heat from the outer to the inner tube. The tube was provided with a thirty-six inch thermocouple well and top and bottom fittings to permit the introduction of the reactants via metering pumps and calibrated flowmeters to the top of the tube and for the withdrawal of the products from the bottom of the tube. The products were collected in a series of condensers and were refined by distillation. The catalyst was located in the lower half of the tube allowing about eighteen inches preheating and vaporizing space which was packed with an inert ceramically bonded porous alumina.

A catalyst was made up in the manner described in Example I and was placed in the reactor tube, with no special precautions being observed in charging the catalyst other than the expected ones of cleanliness and freedom from contact with poisons such as chlorine, sulfur fumes, mercury and the like. The catalyst consisted of 10 percent by weight of copper, as the metal, 3.39 percent calcium, as the carbonate, and 0.46 percent chromium, as the sesquioxide, all deposited on commercial activated alumina (grade F-1, Aluminum Company of America). After being heated to a temperature of 350° C. in a stream of air the catalyst was reduced in hydrogen over a period of eight hours at a temperature of 290° C.

Ethanol was passed over the catalyst at the rate of 2 gram mols per liter of catalyst per hour and ammonia and hydrogen were concurrently passed over the catalyst at the rate of 4 gram mols of each per liter of catalyst per hour, with the temperature being maintained at 310° C. The space velocity was 224 liters of total vapor per liter of catalyst per hour calculated at standard conditions. There was obtained a 71.5 percent yield of acetonitrile together with 6.7 percent triethylamine, 10.0 percent diethylamine and 10.0 percent monoethylamine.

Example III

This example shows the effect of temperature on catalyst life and yield of nitrile. The catalyst, equipment, conditions and reactants were all the same as in Example II, with the exception of the temperature. Runs were made at three different temperatures and each run was terminated when the yield of acetonitrile had declined and the production of residue had increased to the point that operation became impractical. The yields of nitrile given were chosen from samples taken at about halfway through the run, so that they represent average values. The yields of acetonitrile decreased and the yields of ethylamines increased during any run, with the efficiency remaining high for the period indicated:

| Temperature, °C. | Time of Run, Hours | Average Yield of Acetonitrile, Percent |
| --- | --- | --- |
| 290 | 160 | 58 |
| 310 | 100 | 63 |
| 325 | 50 | 87 |

Example IV

A run was made in which the reactants, equipment, temperature and conditions were the same as in Example II. The catalyst was also identical except that the weight percentage of calcium carbonate in the catalyst was only 1.8 percent rather than 3.39 percent as in Example II. The total yield of useful products was 70.3 percent, there being 22.0 percent acetonitrile, 19.0 percent triethylamine, 15.0 percent diethylamine and 14.3 percent monoethylamine. This example illustrates the decrease in yield of the desired nitrile when the percentage of calcium carbonate in the catalyst is lowered from the optimum 3.6 percent.

Example V

A run was made in which the reactants, equipment, temperature and conditions were the same as in Example II. The catalyst was also identical except that the weight percentage of calcium carbonate in the catalyst was 7.14 percent rather than 3.39 percent as in Example II. The total yield of useful products was 92.2 percent, there being 45.0 percent acetonitrile, 19.2 percent triethylamine, 16.0 percent diethylamine and 12.0 percent monoethylamine. This example illustrates the somewhat reduced yield of the desired nitrile when the percentage of calcium carbonate in the catalyst is raised from the optimum 3.6 percent.

Example VI

A run was made in which the reactants, equipment, temperature and conditions were the same as in Example II. The catalyst was the same also except that in place of the calcium carbonate the catalyst contained instead 4.0 percent by weight of barium hydroxide. The total yield of useful products was 93.2 percent, there being 70.0 percent acetonitrile, 11.3 percent triethylamine, 5.8 percent diethylamine and 6.1 percent monoethylamine.

Example VII

A run was made in which the reactants, equipment, temperature and conditions were the same as in Example II. The catalyst was the same also except that in place of the calcium carbonate the catalyst contained instead 5.0 percent by weight of strontium hydroxide. The total yield of useful product was 87.6 percent, there being 67.3 percent acetonitrile, 13.4 percent triethylamine, 2.9 percent diethylamine and 4.0 percent monoethylamine.

Example VIII

A run was made in which reactants, equipment, temperature and conditions were the same as in Example II. The catalyst was the same also except that in place of the calcium carbonate the catalyst contained instead 5.0 percent by weight of lithium hydroxide. The total yield of useful product was 89.2 percent, there being 52.6 percent acetonitrile, 14.0 percent triethylamine, 14.5 percent diethylamine and 8.1 percent monoethylamine.

What we claim is:

1. A process for the production of nitriles which comprises reacting in the vapor phase a primary alcohol with ammonia at a temperature of 250° C. to 350° C. and in the presence of a catalyst having as essential constituents thereof copper, chromium oxide, activated alumina and a metal compound selected from the group consisting of calcium carbonate, barium carbonate, lithium carbonate, strontium carbonate, barium hydroxide, lithium hydroxide and strontium hydroxide, said essential constituents being present in the proportions by weight of from 3 to 15 percent of copper, from 0.25 to 2 percent of chromium oxide, from 1 to 9.2 percent of said metal compound and the balance activated alumina.

2. A process for the production of nitriles which comprises reacting in the vapor phase a primary alcohol with ammonia at a temperature of 250° C. to 350° C. and in the presence of a catalyst having as essential constituents copper, chromium oxide, activated alumina and calcium carbonate, said essential constituents being present in the proportions by weight of from 3 to 15 percent of copper, from 0.25 to 2 percent of chromium oxide, from 1.8 to 7.5 percent of calcium carbonate and the balance activated alumina.

3. A process for the production of nitriles which comprises reacting in the vapor phase a primary alcohol with ammonia at a temperature of 250° C. to 350° C. and in the presence of a catalyst having as essential constituents copper, chromium oxide, activated alumina and barium carbonate, said essential constituents being present in the proportions by weight of from 3 to 15 percent of copper, from 0.25 to 2 percent of chromium oxide, from 1.2 to 5.8 percent of barium carbonate and the balance activated alumina.

4. A process for the production of nitriles which comprises reacting in the vapor phase a primary alcohol with ammonia at a temperature of 250° C. to 350° C. and in the presence of a catalyst having as essential constituents copper, chromium oxide, activated alumina and lithium carbonate, said essential constituents being present in the proportions by weight of from 3 to 15 percent of copper, from 0.25 to 2 percent of chromium oxide, from 3.1 to 9.2 percent of lithium carbonate and the balance activated alumina.

5. A process for the production of nitriles which comprises reacting in the vapor phase a primary alcohol with ammonia at a temperature of 250° C. to 350° C. and in the presence of a catalyst having as essential constituents copper, chromium oxide, activated alumina and strontium carbonate, said essential constituents being present in the proportions by weight of from 3 to 15 percent of copper, from 0.25 to 2 percent of chromium oxide, from 1.2 to 7.3 percent of strontium carbonate and the balance activated alumina.

6. A process for the production of nitriles which comprises reacting in the vapor phase a primary alcohol with ammonia at a temperature of 250° C. to 350° C. and in the presence of a catalyst having as essential constituents copper, chromium oxide, activated alumina and barium hydroxide, said essential constituents being present in the proportions by weight of from 3 to 15 percent of copper, from 0.25 to 2 percent of chromium oxide, from 1 to 5 percent of barium hydroxide and the balance activated alumina.

7. A process for the production of nitriles which comprises reacting in the vapor phase a primary alcohol with ammonia at a temperature of 250° C. to 350° C. and in the presence of a catalyst having as essential constituents copper, chromium oxide, activated alumina and lithium hydroxide, said essential constituents being present in the proportions by weight of from 3 to 15 percent of copper, from 0.25 to 2 percent of chromium oxide, from 2 to 6 percent of lithium hydroxide and the balance activated alumina.

8. A process for the production of nitriles which comprises reacting in the vapor phase a primary alcohol with ammonia at a temperature of 250° C. to 350° C. and in the presence of a catalyst having as essential constituents copper, chromium oxide, activated alumina and strontium hydroxide, said essential constituents being present in the proportions by weight of from 3 to 15 percent of copper, from 0.25 to 2 percent of chromium oxide, from 1.0 to 6.0 percent of strontium hydroxide, and the balance activated alumina.

9. A process for the production of nitriles which comprises reacting in the vapor phase a primary alcohol with ammonia at a temperature of 275° C. to 325° C. and in the presence of a catalyst having as essential constituents thereof copper, chromium oxide, activated alumina and a metal compound selected from the group consisting of calcium carbonate, barium carbonate, lithium carbonate, strontium carbonate, barium hydroxide, lithium hydroxide and strontium hydroxide, said essential constituents being present in the proportions by weight of from 3 to 15 percent of copper, from 0.25 to 2 percent of chromium oxide, from 1 to 9.2 percent of said metal compound and the balance activated alumina.

10. A process for the production of nitriles which comprises reacting in the vapor phase a primary alcohol with ammonia at a temperature of 275° C. to 325° C. and in the presence of a catalyst having as essential constituents copper, chromium oxide, activated alumina and calcium carbonate, said essential constituents being present in the proportions by weight of from 3 to 15 percent of copper, from 0.25 to 2 percent of chromium oxide, about 3.6 percent of calcium carbonate and the balance activated alumina.

11. A process for the production of nitriles which comprises reacting in the vapor phase a primary alcohol with ammonia at a temperature of 275° C. to 325° C. and in the presence of a catalyst having as essential constituents copper, chromium oxide, activated alumina and barium carbonate, said essential constituents being present in the proportions by weight of from 3 to 15 percent of copper, from 0.25 to 2 percent of chromium oxide, about 4.6 percent of barium carbonate, and the balance activated alumina.

12. A process for the production of nitriles which comprises reacting in the vapor phase a primary alcohol with ammonia at a temperature of 275° C. to 325° C. and in the presence of a catalyst having as essential constituents copper, chromium oxide, activated alumina and lithium carbonate, said essential constituents being present in the proportions by weight of from 3 to 15 percent of copper, from 0.25 to 2 percent of chromium oxide, about 7.7 percent of lithium carbonate, and the balance activated alumina.

13. A process for the production of nitriles which comprises reacting in the vapor phase a primary alcohol with ammonia at a temperature of 275° C. to 325° C. and in the presence of a catalyst having as essential constituents copper, chromium oxide, activated alumina and strontium carbonate, said essential constituents being present in the proportions by weight of from 3 to 15 percent of copper, from 0.25 to 2 percent of chromium oxide, about 6.0 percent of strontium carbonate and the balance activated alumina.

14. A process for the production of nitriles which comprises reacting in the vapor phase a primary alcohol with ammonia at a temperature of 275° C. to 325° C. and in the presence of a catalyst having as essential constituents copper, chromium oxide, activated alumina and barium hydroxide, said essential constituents being present in the proportions by weight of from 3 to 15 percent of copper, from 0.25 to 2 percent of chromium oxide, about 4 percent barium hydroxide and the balance activated alumina.

15. A process for the production of nitriles which comprises reacting in the vapor phase a primary alcohol with ammonia at a temperature of 275° C. to 325° C. and in the presence of a catalyst having as essential constituents copper, chromium oxide, activated alumina and lithium hydroxide, said essential constituents being present in the proportions by weight of from 3 to 15 percent copper, from 0.25 to 2 percent of chromium oxide, about 5 percent of lithium hydroxide and the balance activated alumina.

16. A process for the production of nitriles which comprises reacting in the vapor phase a primary alcohol with ammonia at a temperature of 275° C. to 325° C. and in the presence of a catalyst having as essential constituents copper, chromium oxide, activated alumina and strontium hydroxide, said essential constituents being present in the proportions by weight of from 3 to 15 percent of copper, from 0.25 to 2 percent of chromium oxide, about 5 percent of strontium hydroxide and the balance activated alumina.

17. A process for the production of acetonitrile which comprises reacting in the vapor phase ethanol with ammonia at a temperature of 250° C. to 350° C. and in the presence of a catalyst having as essential constituents thereof copper, chromium oxide, activated alumina and a metal compound selected from the group consisting of calcium carbonate, barium carbonate, lithium carbonate, strontium carbonate, barium hydroxide, lithium hydroxide and strontium hydroxide, said essential constituents being present in the proportions by weight of from 3 to 15 percent of copper, from 0.25 to 2 percent of chromium oxide, from 1 to 9.2 percent of said metal compound and the balance activated alumina.

18. A process for the production of acetonitrile which comprises reacting in the vapor phase ethanol with ammonia at a temperature of 250° C. to 350° C. and in the presence of a catalyst having as essential constituents thereof copper, chromium oxide, activated alumina and calcium carbonate, said essential constituents being present in the proportions by weight of from 3 to 15 percent of copper, from 0.25 to 2 percent of chromium oxide, from 1.8 to 7.5 percent of calcium carbonate and the balance activated alumina.

19. A process for the production of acetonitrile which comprises reacting in the vapor phase ethanol with ammonia at a temperature of 275° C. to 325° C. and in the presence of a catalyst having as essential constituents thereof copper, chromium oxide, activated alumina and calcium carbonate, said essential constituents being present in the proportions by weight of from 3 to 15 percent of copper, from 0.25 to 2 percent of chromium oxide, about 3.6 percent of calcium carbonate and the balance activated alumina.

References Cited in the file of this patent

UNITED STATES PATENTS

| | | |
|---|---|---|
| 2,337,422 | Spence et al. | Dec. 21, 1943 |
| 2,487,299 | Bishop et al. | Nov. 8, 1949 |
| 2,644,834 | Max | July 7, 1953 |

OTHER REFERENCES

Berkman: "Catalysis" (1940), page 889.